(12) United States Patent
Becker et al.

(10) Patent No.: US 8,202,341 B2
(45) Date of Patent: Jun. 19, 2012

(54) FILTER

(75) Inventors: Stefan Becker, Speyer (DE); Duc Cuong Nguyen, Laatzen (DE); Karlheinz Münkel, Oberderdingen-Flehingen (DE); Steffen Ackermann, Speyer (DE)

(73) Assignee: Mann+Hummel GmbH, Ludwigsburg (DE)

( * ) Notice: Subject to any disclaimer, the term of this patent is extended or adjusted under 35 U.S.C. 154(b) by 498 days.

(21) Appl. No.: 12/412,661

(22) Filed: Mar. 27, 2009

(65) Prior Publication Data

US 2009/0241489 A1  Oct. 1, 2009

(30) Foreign Application Priority Data

Mar. 27, 2008 (DE) .................... 20 2008 004 288 U

(51) Int. Cl.
*B01D 46/00* (2006.01)

(52) U.S. Cl. ............... 55/498; 55/337; 55/502; 55/507; 55/510; 55/DIG. 17; 210/493.2; 210/497.01

(58) Field of Classification Search .............. 55/320, 55/337, 498, DIG. 17, DIG. 19, DIG. 25, 55/502, 507, 510; 210/493.2, 497.01
See application file for complete search history.

(56) References Cited

U.S. PATENT DOCUMENTS

| 3,508,383 | A | * | 4/1970 | Buonpastore et al. | ........... 55/337 |
| 4,141,700 | A | * | 2/1979 | Norton et al. | .................... 55/337 |
| 5,753,117 | A | * | 5/1998 | Jiang | ............................. 210/232 |
| 5,755,842 | A | * | 5/1998 | Patel et al. | ...................... 55/330 |
| 5,893,937 | A | * | 4/1999 | Moessinger | ................. 55/385.3 |
| 6,419,718 | B1 | * | 7/2002 | Klug et al. | ....................... 55/320 |
| 6,599,350 | B1 | * | 7/2003 | Rockwell et al. | .............. 96/135 |
| 6,852,148 | B2 | * | 2/2005 | Gieseke et al. | ................. 95/287 |
| 7,070,642 | B2 | * | 7/2006 | Scott et al. | ...................... 55/498 |
| 7,326,266 | B2 | * | 2/2008 | Barnwell | ........................ 55/319 |
| 7,537,631 | B2 | * | 5/2009 | Scott et al. | ...................... 55/498 |
| 7,662,203 | B2 | * | 2/2010 | Scott et al. | ...................... 55/498 |

FOREIGN PATENT DOCUMENTS

| DE | 380602 | 9/1923 |
| DE | 3807827 | 9/1989 |
| DE | 10327441 | 1/2005 |

OTHER PUBLICATIONS

German Patent Office search report for related German patent application DE 20 2008 004 288.7.

* cited by examiner

*Primary Examiner* — Robert Clemete
(74) *Attorney, Agent, or Firm* — James Hasselbeck

(57) ABSTRACT

A filter is disclosed that includes a filter cup, a filter insert inserted into the filter cup and having a substantially cylindrical shape and a terminal disk arranged at an end face of the filter insert and connected to an end of the filter cup. The terminal disk includes a circumferential rim configured to engage the end of the filter cup and is provided with locking means that positive-lockingly connects the terminal disk and the filter cup.

9 Claims, 2 Drawing Sheets

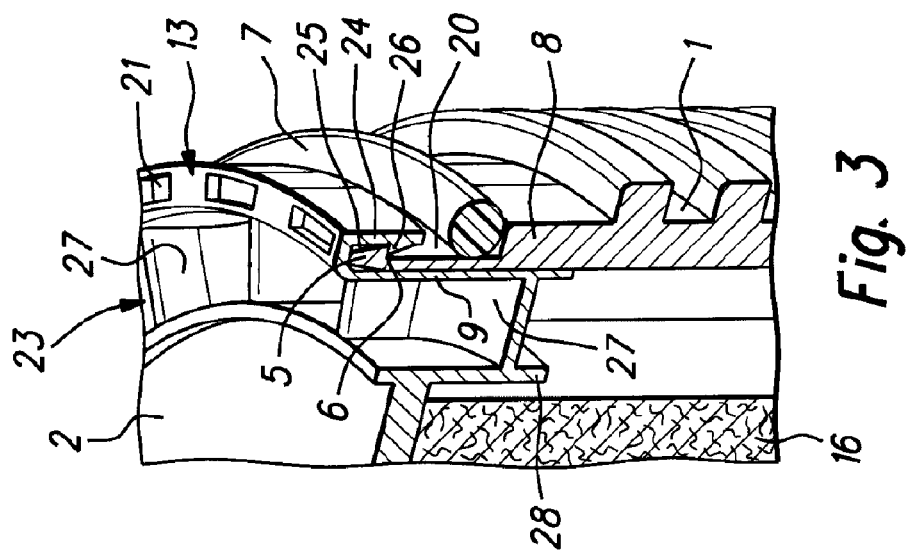
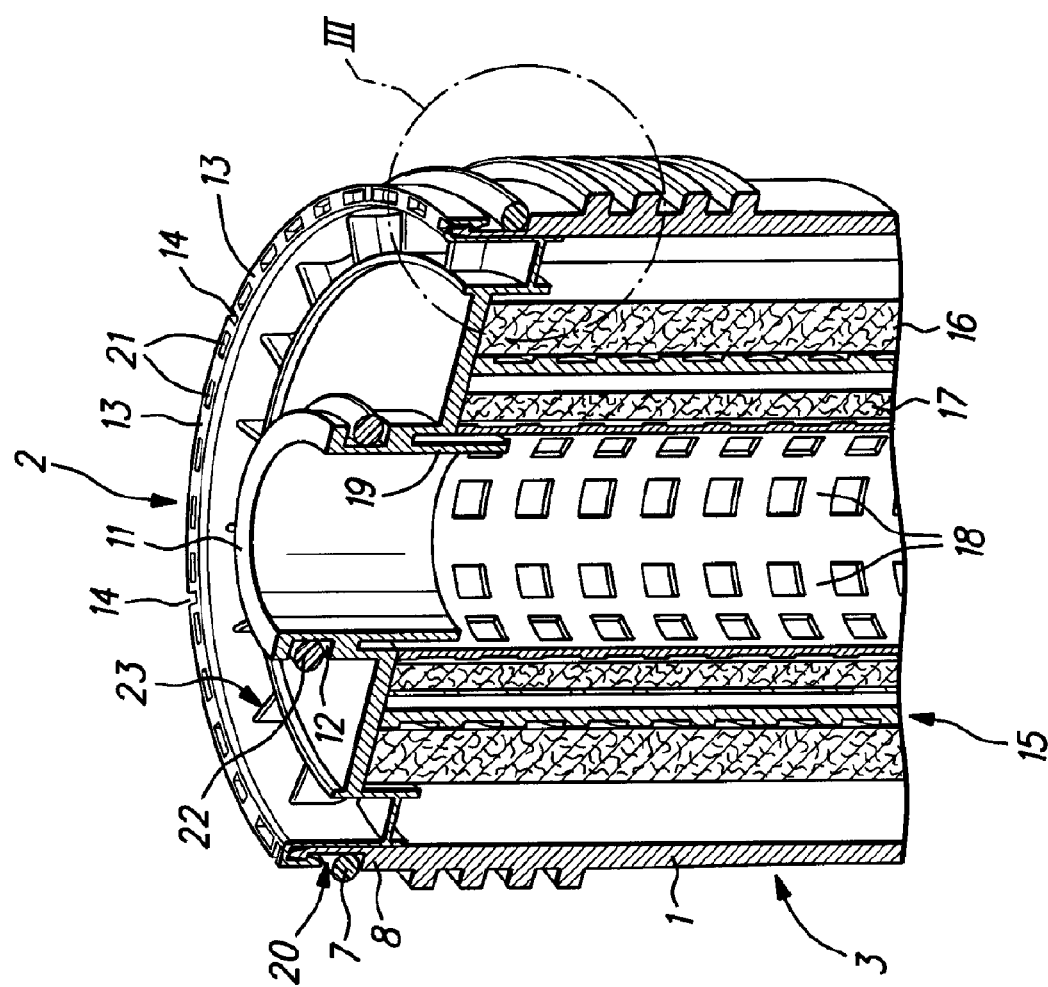

ID
FILTER

CROSS REFERENCE TO RELATED APPLICATIONS

This application claims the benefit under 35 USC 119 of foreign application DE 20 2008 004 288.7 filed in Germany on Mar. 27, 2008.

TECHNICAL FIELD

The invention relates to a filter comprising a filter cup and a filter insert received therein and having a substantially cylindrical shape as well as a terminal disk arranged at the end face of the filter insert and connected to the end face of the filter cup.

BACKGROUND OF THE INVENTION

Filters are comprised in general of a filter cup and a filter insert received therein. This filter insert is often of a substantially cylindrical configuration so that the fluid to be filtered flows through the filter insert radially from the exterior to the interior. For attaching the filter insert and for closing off the end face, a terminal disk is provided that is connected to the end face of the filter cup.

Such filters are often used as elements for removing oil from air especially in stationary and movable compressor devices. The compressors provided for this purpose require oil for lubricating and sealing the moving parts so that oil-containing gases are generated. In order to recapture most of this oil and in order to purify the air, oil-removing elements are used that, during the course of maintenance of the device, must be exchanged regularly.

It is therefore an object of the present invention to provide a filter of the aforementioned kind that is simple with regard to its configuration and can be produced inexpensively.

SUMMARY OF THE INVENTION

An object of the present invention to provide a filter of the aforementioned kind that is simple with regard to its configuration and can be produced inexpensively. In accordance with the present invention, this is achieved by designing the terminal disk at its circumferential rim in such a way that it engages across the end of the filter cup and is provided with locking means for a positive-locking connection of the terminal disk and the filter cup.

According to an advantageous embodiment of the invention, at the circumferential rim of the terminal disk ring segments are provided that axially engage the end of the filter cup and have radially inwardly oriented snap-on hooks wherein on the filter cup includes at least one radially outwardly oriented projection that is arranged to be engaged by the snap-on hooks. In this way, mounting of the terminal disk on the filter cup is very simple because the terminal disk does not need to be aligned and instead is simply attached by being pressed on. Rotation of the terminal disk relative to the housing is still enabled in this way.

Moreover, it is expedient that openings are provided in the end face of the ring segments. These openings enable the manufacture of an inexpensive terminal disk with snap-on hooks by injection molding because in this way the injection mold can mold the undercuts for the snap-on hooks. The snap-on hooks are formed as undercuts only below the openings and are demolded through these openings. Below the closed areas between the openings no snap-on hooks are formed. Other methods, for example, forced demolding or other geometries are also possible. Moreover, it is advantageous that on the exterior side of the filter cup a circumferentially extending projection is arranged so that between the free end of the ring segments and the projection a circumferentially extending groove for receiving a sealing ring is formed. In this way, the sealing ring is automatically secured in its position by mounting the terminal disk without requiring additional measures. The sealing ring projects relative to its circumference somewhat past the outer circumference of the ring segments so that the sealing ring rests against the inner wall of a filter head that is to be attached to the filter cup and therefore effects the sealing action.

In order for the terminal disk to be secured at the end of the filter cup in a fixed or play-free way, it is expedient that the terminal disk in the area of its outer circumference has an axial section that rests seal-tightly on the inner wall of the filter cup. Expediently, the filter is configured as an air oil separator box and has a collecting chamber for the separated oil. In this connection it is expedient that in the terminal disk a pre-separator is integrated wherein this pre-separator is comprised of a plurality of guiding elements that are curved in the axial direction of the filter insert and are arranged between the axial section and a socket that is positioned coaxially thereto.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

FIG. 2 presents a longitudinal section of the filter of FIG. 1; and

FIG. 3 depicts detail III of FIG. 2.

Figure 1:
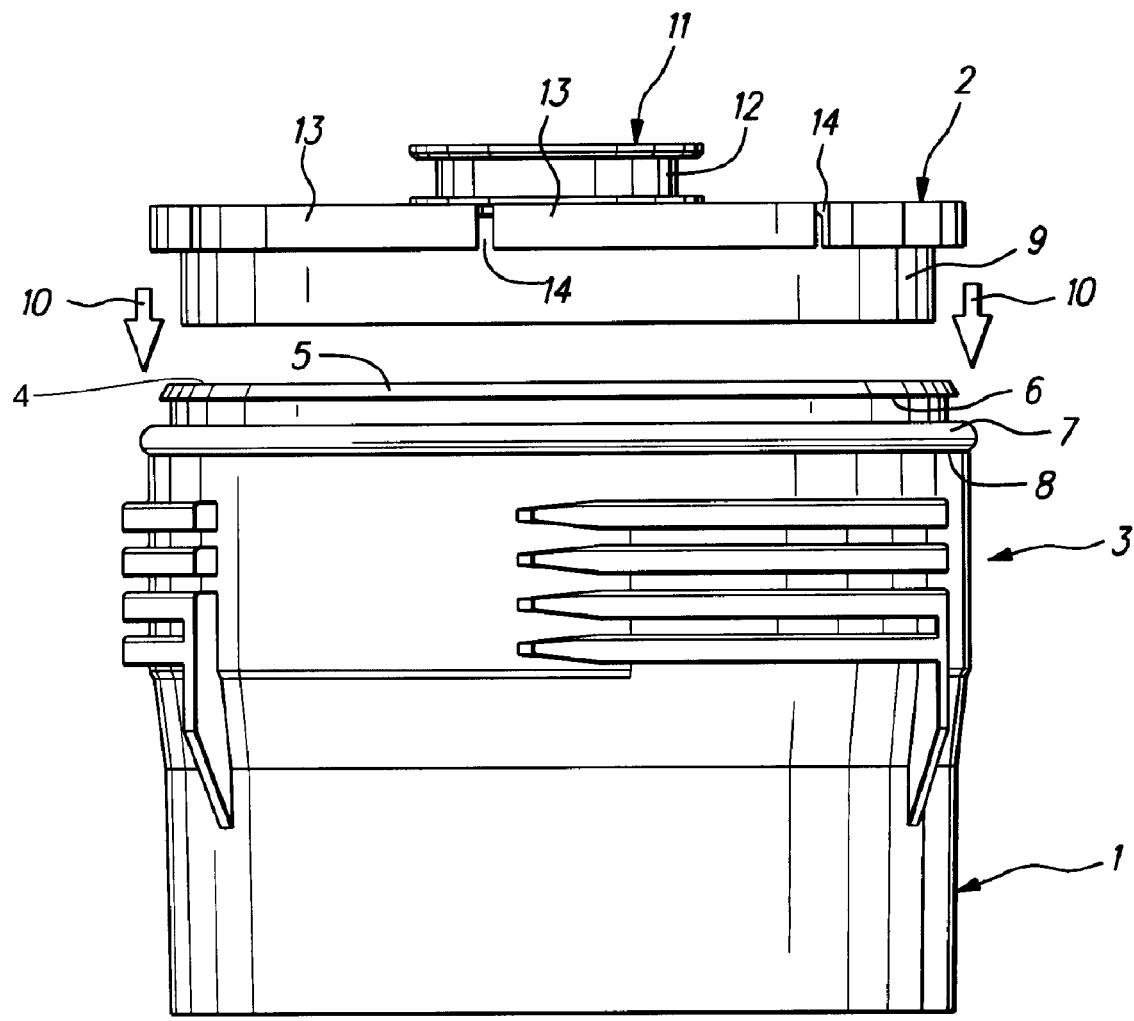
FIG. 1 depicts a side view of a filter cup and of a terminal disk, consistent with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a filter apparatus. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 shows a side view of a substantially cylindrical filter cup 1 and a terminal disk 2 of a filter 3 that is to be connected thereto. In the illustrated embodiment, the filter 3 is an air oil separator box that is in particular used in connection with air compressors. The filter cup 1 has at its end face 4 an outwardly oriented radial projection 5 that, in the direction toward the terminal disk 2, tapers conically and has a radial projection 6 on the side that is facing the filter cup 1. The projection 5 is designed to extend about the entire circumference of the filter cup 1. At a spacing to the projection 5, a sealing ring 7 is provided on the circumference of the filter cup 1 and resting against a circumferential projection 8.

The terminal disk 2 comprises an axial section 9 whose circumference is designed such that it can be inserted at the end face into the filter cup 1, as illustrated by the arrows 10 indicating the mounting direction. The terminal disk 2 has at its top side shown in FIG. 1 a connecting socket 11 with a groove 12 for receiving a seal. The outer circumferential rim of the terminal disk 2 has several ring segments 13 that are separated from one another by narrow radial slots 14. As will be explained, the ring segments 13 of the terminal disk 2 engage in the mounted state, (i.e., after assembly according to the arrows 10), the filter cup 1 in that the projection 5 is received in a groove that is formed in the ring segments 13.

FIG. 2 shows a longitudinal section of the filter 3. In the filter cup 1 a filter insert 15 is concentrically arranged and is comprised of two cylindrical layers 16, 17 of filter material and a support grid 18 that is positioned inside the radially inner layer 17. At the end face of the filter insert 15 the terminal disk 2 is arranged. On the socket 11 an axially inwardly extending sleeve section 19 is integrally formed and projects into the end of the support grid 18 and therefore centers the filter insert 15. FIG. 2 shows also a seal 22 arranged in groove 12.

The terminal disk 2 has at its circumferential rim several ring segments 13 that are separated from one another only by narrow radial slots 14. By means of the radial slots 14 a sufficient elasticity or flexibility is provided in order to provide together with the radial projection 5 of the filter cup 1 a snap-on connection whose configuration will be explained in more detail infra. In the mounted stated according to the illustration of FIG. 2 the spacing of the ends of the rings segments 13 facing the filter cup 1 relative to the projection 8 provides a circumferential groove 20 in which the sealing ring 7 is arranged. Several openings 21 are provided in the end face of the ring segments 13. Neighboring the ring segments 13 a pre-separator is arranged at the radial inner side.

In FIG. 3 a detail illustration of the detail III of FIG. 2 is shown. This illustration shows that the ring segments 13 have an axial section 24 with which they engage the end of the filter cup 1. The terminal disk 2 comprises also the axial section 9, as already described in connection with FIG. 1, which axial section rests seal-tightly against the inner wall of the filter cup 1. Between the axial sections 9 and 24 an axial groove 25 is formed in which the axial end of the filter cup 1 is received. At the free end of the axial section 24 of the ring segment 13 there is a radially inwardly oriented snap-on hook 26 that upon mounting of the terminal disk 2 on the filter cup 1 is pushed across the circumferential projection 5 and locks on the radial projection 6. For demolding the snap-on hook when producing the terminal disk 2 by injection molding openings 21 are provided at its end face.

As can be seen in FIG. 3, the sealing ring 7 is positioned in the spacing between the ring segment 13 and the projection 8. The pre-separator 23 is comprised of a plurality of guiding elements 27 that are curved in the axial direction and are arranged between the axial section 9 and the coaxially positioned socket 28. The pre-separator 23 forces a change of direction of the oil-containing air stream. This change of direction has the effect that the oil components are separated partially because, as a result of their greater mass, they have a tendency to maintain their direction of movement. This causes the formation of droplets that drop down or flow along the inner wall of the filter cup 1 in the downward direction. The oil components that are still contained in the air stream are separated at the layers 16 and 17 (compare FIG. 2). For same parts the same reference numerals are used in FIGS. 2 and 3.

By means of the present invention, in comparison to prior art filters, the mounting expenditure for insertion of the sealing ring can be reduced. The utilization of the filter is independent of its position. Mounting of the filter cup is facilitated in that the rotation between terminal disk and filter cup is still maintained. A further advantage resides in that the terminal disk can be combined in a simple way with a pre-separator.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A filter comprising:
   a filter cup;
   a filter insert having at least one layer of filter material, said filter insert inserted into said filter cup and having a substantially cylindrical shape;
   a terminal disk arranged at an end face of said filter insert and abutting against an axial end of said at least one layer of filter material, said terminal disk positively-lockingly connected to an axially outwardly protecting circumferential wall of an end of said filter cup;
   said terminal disk having a circumferential rim wherein said circumferential rim is configured to engage said end of said filter cup and is provided with locking means that positive-lockingly connect said terminal disk and said filter cup;

wherein said circumferential rim of said terminal disk comprises ring segments, wherein adjacent ring segments separated from one another by narrow radial slots extending though an outer circumferential rim of said terminal disk, wherein said ring segments axially engage said end of said filter cup, wherein said locking means are radially inwardly oriented snap-on hooks provided on said ring segments, and wherein said filter cup has at least one radially outwardly oriented projection that is engaged by said snap-on hooks.

2. The filter according to claim 1, wherein said ring segments have an end face provided with openings for demolding said snap on hooks.

3. The filter according to claim 1, wherein
said terminal disk has an outer circumference provided with an axial section,
wherein said axial section rests against an inner wall of said filter cup.

4. The filter according to claim 1 in the form of an air oil separator box comprising a collecting chamber for separated oil.

5. The filter according to claim 1, wherein said terminal disk comprises an integrally formed preseparator.

6. The filter according to claim 1, wherein
on an exterior side of said filter cup a circumferentially extending projection is arranged and
wherein between free ends of said ring segments and said circumferentially extending projection a circumferentially extending groove is formed for receiving a sealing ring.

7. The filter according to claim 5, wherein
said terminal disk has an axial section at an outer circumference of said terminal disk and a coaxially arranged socket inside said axial section,
wherein said pre-separator is comprised of a plurality of curved guiding elements that are curved in an axial direction of said filter insert and are arranged between said axial section and said coaxially arranged socket.

8. A filter comprising:
a filter cup;
a filter insert inserted into said filter cup and having a substantially cylindrical shape;
a terminal disk arranged at an end face of said filter insert and connected to an end of said filter cup;
said terminal disk having a circumferential rim wherein said circumferential rim is configured to engage said end of said filter cup and is provided with locking means that positive-lockingly connect said terminal disk and said filter cup,
wherein said circumferential rim of said terminal disk comprises ring segments,
wherein said ring segments axially engage said end of said filter cup,
wherein said locking means are radially inwardly oriented snap-on hooks provided on said ring segments,
wherein said filter cup has at least one radially outwardly oriented projection that is engaged by said snap-on hooks,
wherein on an exterior side of said filter cup a circumferentially extending projection is arranged and
wherein between free ends of said ring segments and said circumferentially extending projection a circumferentially extending groove is formed for receiving a sealing ring.

9. A filter comprising:
a filter cup;
a filter insert inserted into said filter cup and having a substantially cylindrical shape;
a terminal disk arranged at an end face of said filter insert and connected to an end of said filter cup;
said terminal disk having a circumferential rim wherein said circumferential rim is configured to engage said end of said filter cup and is provided with locking means that positive-lockingly connect said terminal disk and said filter cup,
wherein said terminal disk comprises an integrally formed preseparator,
wherein said terminal disk has an axial section at an outer circumference of said terminal disk and a coaxially arranged socket inside said axial section,
wherein said pre-separator is comprised of a plurality of curved guiding elements that are curved in an axial direction of said filter insert and are arranged between said axial section and said coaxially arranged socket.

\* \* \* \* \*